United States Patent [19]
D'Amico

[11] Patent Number: 6,022,068
[45] Date of Patent: Feb. 8, 2000

[54] LIGHTWEIGHT BODY FOR A DUMP TRUCK

[75] Inventor: John A. D'Amico, Casper, Wyo.

[73] Assignee: Caterpillar Inc., Peoria, Ill.

[21] Appl. No.: 09/045,345

[22] Filed: Mar. 20, 1998

[51] Int. Cl.⁷ .................................................. B60P 1/00
[52] U.S. Cl. ............................. 296/184; 296/39.2; 298/7
[58] Field of Search .................. 296/39.2, 182, 296/183, 184, 204; 298/1 R, 7

[56] References Cited

U.S. PATENT DOCUMENTS

| | | | |
|---|---|---|---|
| H1318 | 6/1994 | Rozenboom et al. | 296/39.2 |
| 1,461,905 | 7/1923 | Hughes | 296/183 |
| 1,461,906 | 7/1923 | Hughes | 296/184 |
| 1,675,317 | 7/1928 | Burke . | |
| 3,188,131 | 6/1965 | Attwood | 296/28 |
| 3,897,972 | 8/1975 | Logue | 296/28 |
| 3,938,238 | 2/1976 | Kershaw et al. | 29/469 |
| 5,454,620 | 10/1995 | Hill et al. | 296/184 |
| 5,476,285 | 12/1995 | Dickerson | 280/781 |
| 5,662,374 | 9/1997 | Wheeler | 296/184 |

OTHER PUBLICATIONS

© 1997 Leong Jin Corporation Pte Ltd; Leong Jin homepage Products & Services; Hardox 400/500 Abrasion Resistant Steel Plates, 5 pp.

*Primary Examiner*—D. Glenn Dayoan
*Assistant Examiner*—Chad D. Wells
*Attorney, Agent, or Firm*—Thompson & Knight

[57] ABSTRACT

A lightweight body for a dump truck includes a floor with a pair of opposed spaced upwardly extending side walls coupled thereto. An upwardly extending front wall is included and coupled to the floor between the side walls to thereby create a space for carrying a payload and a rearward spillway for dumping the payload. The floor is formed of a plurality of adjacently positioned sections that are either separate pieces or form part of one continuous piece. The sections are arranged in an order of increasing thickness or hardness with the thickest or hardest section located at the spillway. This body structure substantially reduces weight while simultaneously preserving body strength, thereby allowing dump truck payload capability to be increased.

23 Claims, 4 Drawing Sheets

LIGHTWEIGHT BODY FOR A DUMP TRUCK

FIELD OF THE INVENTION

The present invention relates to dump trucks and more particularly pertains to a lightweight body for a dump truck that allows for a substantial reduction of dump truck weight to thereby increase payload capability. The particular structure of the body further enables a relatively uniform wear thereof to occur and thus maximize operational use over its lifetime.

DESCRIPTION OF THE PRIOR ART

Trucks utilized for the purpose of transporting payloads have been developed to fulfillment of a variety of objectives and requirements. By way of example, U.S. Pat. No. 1,675,317 discloses a truck body construction that is formed of comparatively thin sheet metal to make the sides, front and bottom strong and durable and not make the body unduly heavy. U.S. Pat. No. 3,188,131 discloses a vehicle body structure of a modular construction using standard metal panels that are suitably joined and reinforced to provide desired variations in size and access to its cargo receiving body compartments. U.S. Pat. No. 3,897,972 discloses a reinforced dump body for a truck whose reinforcement structure is accomplished by a C-clamp principle such that the strength to weight ratio is maximized. U.S. Pat. No. 3,938,238 discloses a method for making a modular truck body that includes a plurality of aligned and preassembled modules that are reassembled and secured together for installation on the frame of a truck at a job site. U.S. Pat. No. 5,454,620 discloses a stressed-skin cargo carrier that includes longitudinal support members which may become an integral part of the vessel in open top embodiments by provision of a reinforcing member along an extended open edge of an adequate horizontal moment of inertia. Lastly, U.S. Pat. No. 5,476,285 discloses a dump truck body whereby the weight of the body can be reduced by using a floor reinforced by longitudinal reinforcing beams and a single transverse beam and whereby wear on the sides of the body may be minimized by increasing the width of the body floor.

Although the vehicles and related structures disclosed in the aforementioned patents provide for increased strength, reduced weight, and enhanced configurability, there exists a need for a dump truck body structure which allows dump truck payload capacity to be maximized and yet simultaneously provide increased strength, reduced weight, and prolonged operational life.

SUMMARY OF THE INVENTION

The present invention substantially departs from the described prior art by providing a body for a dump truck that incorporates the use of thinner rigid plate at its forward end and thicker and/or harder rigid plate at its rearward end in order to reduce weight and thus increase overall dump truck payload capability.

The body of the present invention provides a structure that allows a relatively uniform wear thereof to occur during normal operating cycles to maximize its operational use.

The present invention includes a body for a dump truck having a floor, a pair of opposed spaced upwardly extending side walls coupled to the floor, and an upwardly extending front wall coupled to the floor and between the side walls to create a space for carrying a payload and a rearward spillway for dumping the payload. The floor is formed of a plurality of adjacently positioned sections. Each section each has a substantially uniform characteristic thickness wherein the sections are arranged in an order of increasing thickness with the thickest section located at the spillway. Each section has a substantially uniform characteristic hardness wherein the sections may be arranged in an order of increasing hardness with the hardest section located at the spillway. Lastly, each side wall of the body is formed of a plurality of adjacently positioned portions. Each portion has a substantially uniform characteristic thickness. The portions are arranged in an order of increasing thickness with the thickest portion located at the spillway.

DESCRIPTION OF THE PREFERRED EMBODIMENT

Figure 1:
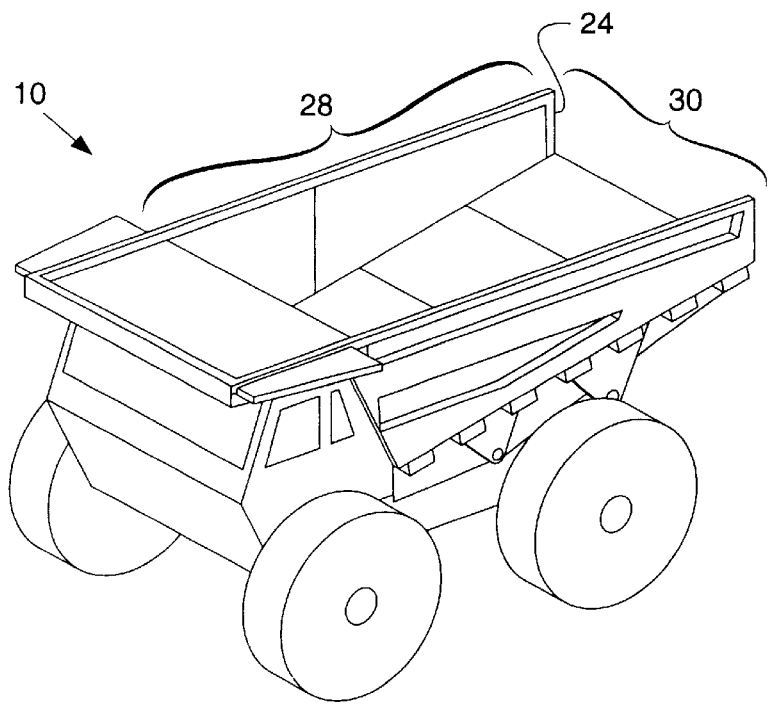
FIG. 1 is a perspective view of a truck body according to the present invention attached to a truck chassis and positioned in an retracted position for carrying a payload.
Figure 2:
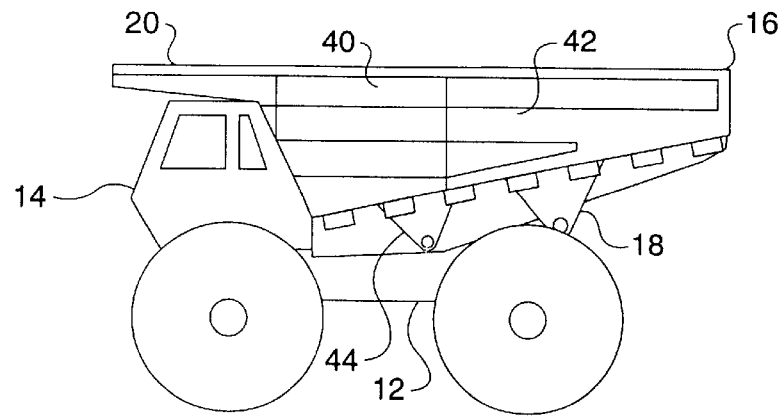
FIG. 2 a side view of the truck of FIG. 1.

Referring now to the drawings, and first to FIGS. 1 and 2, the truck of the present invention is designated generally by reference numeral 10. In the preferred embodiment, truck 10 is a large self-propelled off-highway vehicle capable of carrying hundreds of tons of material in operations such as mining and the like. Truck 10 includes a chassis 12 that is supported by large off-terrain tires. The chassis 12 carries a cab 14 at its forward end and a box-like rigid load carrying body 16 at its rearward end.

The body 16 is movably coupled to the chassis 12 with brackets 18. The body is moveable between load carrying position generally parallel to chassis 12 for allowing a payload to be carried and is further moveable in an unillustrated dumping position with the body extended upwards and away from the chassis for allowing the payload to be dumped. Suitable conventional mechanical or hydraulic lifting mechanisms are provided to allow the body to be retracted and extended in the manner well known to those skilled in the art.

In addition, the body 16 includes a canopy 20 that extends outwardly from the body when the body is in the load carrying position. The canopy 20 extends past the forward end of the truck 10 and serves to shield the cab 14 and the forward end of the truck from debris during loading of the body 16.

Figure 3:
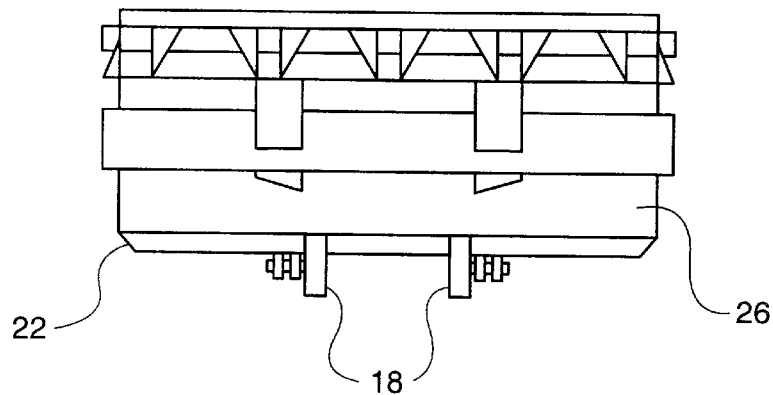
FIG. 3 is a front view of the body of the truck of FIG. 1.

Referring to FIGS. 1 through 3, the body includes a substantially planar floor 22. A pair of oppositely opposed, spaced, and substantially planar side walls 24 that are welded or bolted to the floor and extend upwards therefrom. In addition, a front wall 26 is welded or bolted to the floor and extended upwards therefrom and between the side walls 24 to create a space 28 for carrying the payload. Floor 22 includes a rearward spillway 30 for dumping the payload when the body 16 is placed in the dumping position. Although the floor 22 in the preferred embodiment is substantially planar, it may also have generally V-shaped transverse cross-section for use in specialized mining operations.

Referring to FIGS. 1 and 2, each side wall 24 is formed of a plurality of adjacently positioned or contiguous portions. Each side wall portion has a substantially uniform characteristic thickness and hardness. The portions are arranged in an order of increasing thickness, hardness, or combination thereof with the thickest and/or hardest portions located at the rearward end of body 16. In the preferred embodiment, each side wall 24 includes a front portion 40 and an adjacently positioned rear portion 42. Although, in the preferred embodiment, the side walls include two portions, it should be recognized that the side walls may include more than two portions. The portions are welded or bolted together to form an substantially planar configuration.

In the preferred embodiment, each portion of a side wall has a Brinell Hardness Number (BHN) of approximately 360–440, with the hardness preferably being about 440. The front portion of each side wall has a thickness of approximately ¼–⅜ inch, with the preferred thickness being about 5/16 inch. The rear portion of each side wall has a thickness of approximately 5/16–7/16 inch, with the preferred thickness being about ⅜ inch. However, the portions of a side wall can be modified in shape and size to support a variety of specialized mining operations, as would be apparent to one skilled in the art. In the preferred embodiment, the portions of each side wall are separate pieces but can also form part of one continuous piece.

The floor 22 is further formed of a plurality of adjacently positioned or contiguous sections. Each section has a substantially uniform characteristic thickness and hardness. The sections are arranged in an order of increasing thickness, hardness, or combination thereof, with the thickest and hardest section located at the rearward end of body 22.

As shown in FIG. 2, the sections of the floor 22 are supported by a plurality of rigid transverse supporting ribs 44. The supporting ribs 44 and sections of the floor 22 are welded or bolted together.

Figure 4:
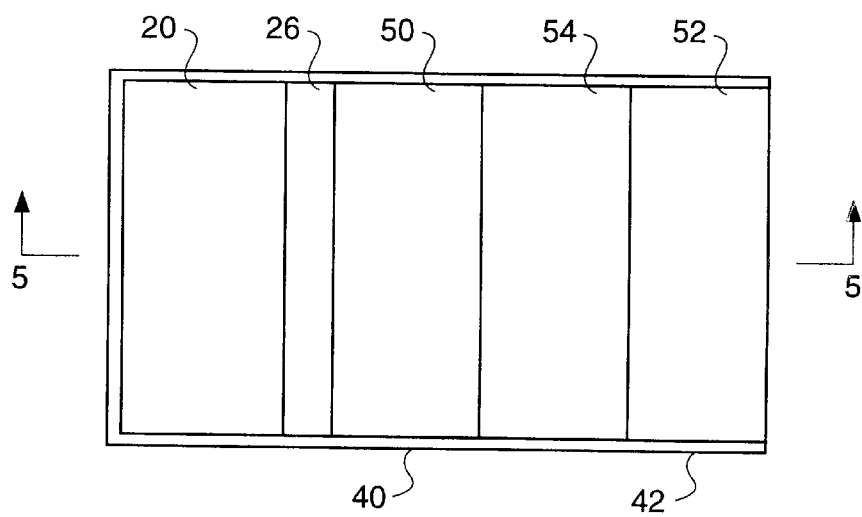
FIG. 4 is a plan view of the body of the truck of FIG. 1.
Figure 5:
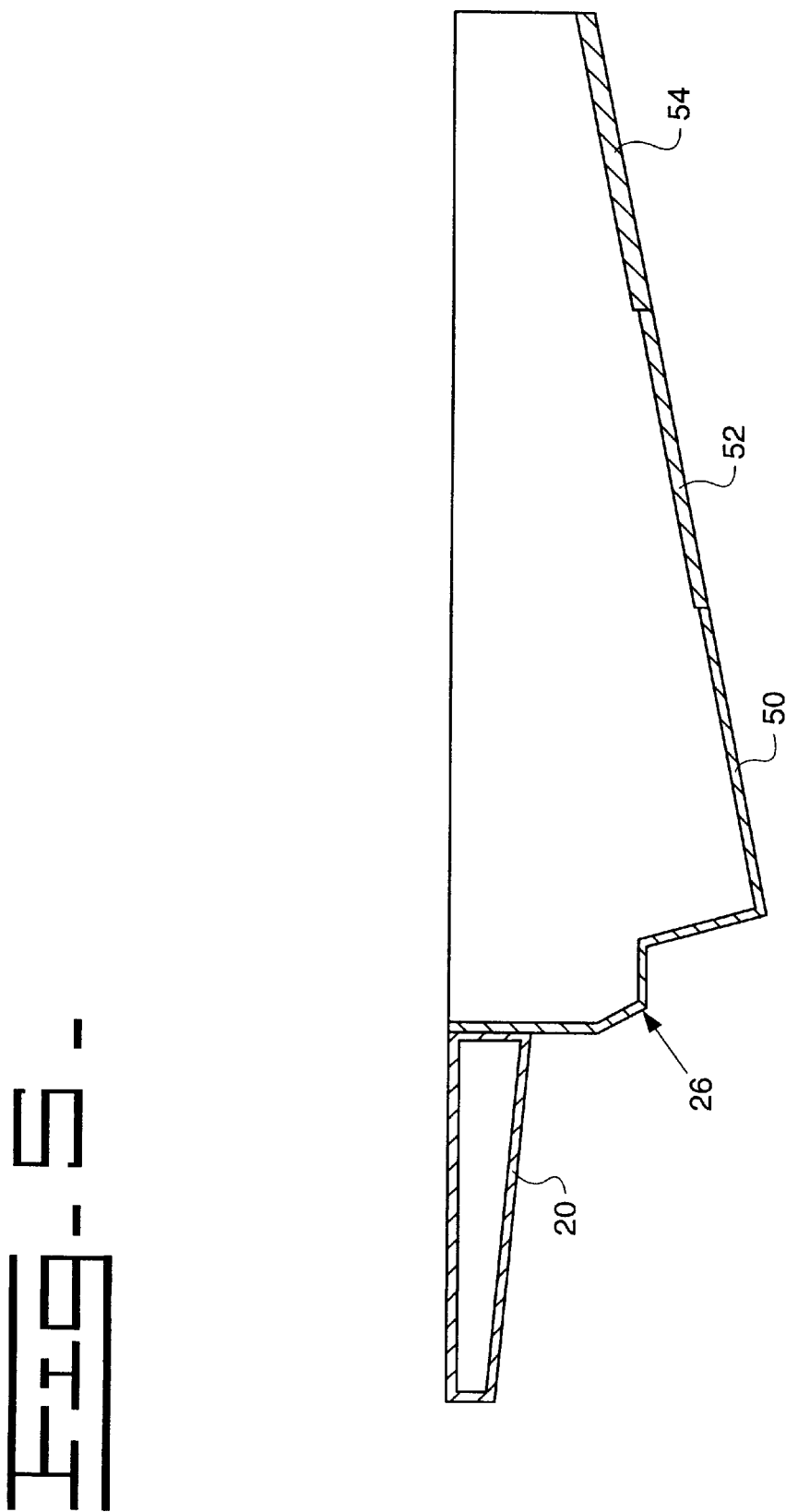
FIG. 5 is a cross-sectional view of the body of the truck taken along the line 5—5 of FIG. 4.
Figure 6:
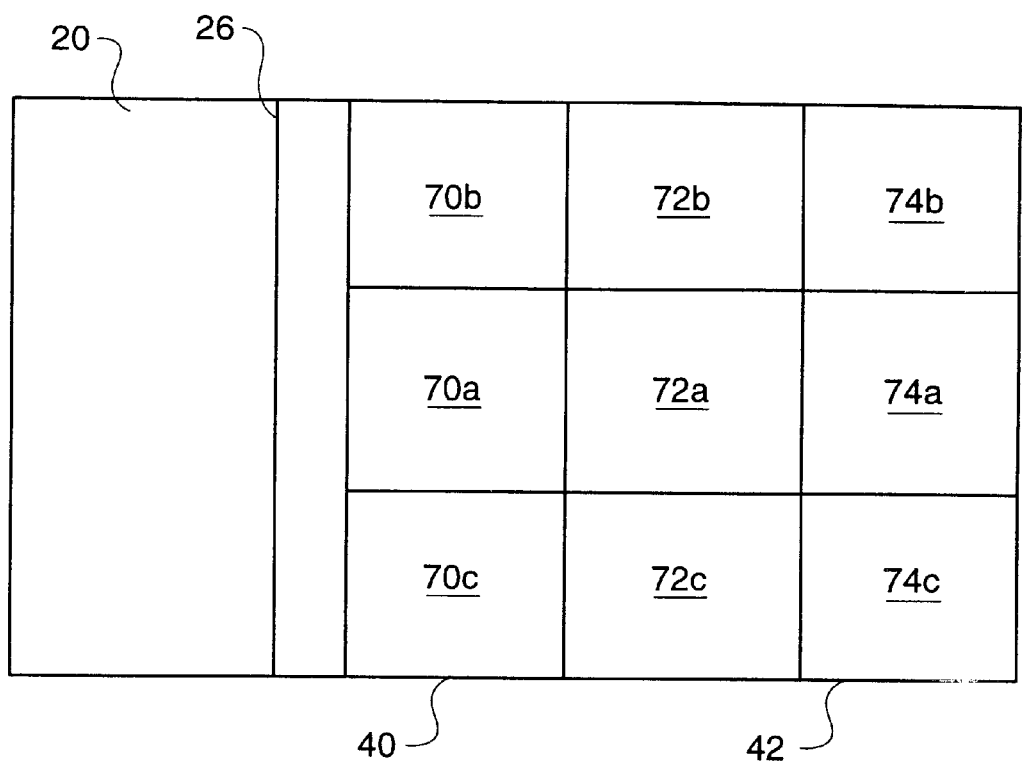
FIG. 6 is a plan view of an alternative embodiment of the body of the truck of the present invention.

Referring now to FIGS. 4 and 5, in the preferred embodiment, the floor 22 includes a front section 50, a rear section 52, and a middle section 54 therebetween. Although, in the preferred embodiment, floor 22 includes three sections, it should be recognized that the floor may include more than three sections. The sections of the floor 22 are separate pieces that are adjacently positioned, substantially planar and rectangular in shape, and substantially equal in width, with the width being measured in parallel with a longitudinal axis of the truck 10. However, the shape of the sections can be modified to support a variety of specialized mining operations. Also, in the preferred embodiment, the floor sections have a substantially uniform thickness extending transversely from one side of the body to the other; however, the floor sections may be thicker in the middle than at the sides. For example, as shown in FIG. 6, each floor section may be fabricated from three or more plates, with a relatively thick plate in the middle and relatively thicker plates at the edges. In the body of FIG. 6, a forward floor section includes a relatively thick center plate 70a and relatively thinner side plates 70b and 70c. Similarly, a middle floor section includes a relatively thick center plate 72a and relatively thinner side plates 72b and 72c. Finally, a rearward floor section includes a relatively thick center plate 74a and relatively thinner side plates 74b and 74c. In accordance with the present invention, the respective floor plates increase in thickness from front to back of the body.

Referring again to the embodiment of FIGS. 4 and 5, the front section of the floor is formed of steel plate that has a thickness of between approximately ¼–½ inch, with the preferable thickness being about ⅜ inch, and a BHN of approximately 360–440, preferably about 440. The middle section of the floor is formed of steel plate that has a thickness of approximately ⅜–¾ inch, preferably about ½ inch, and a BHN of approximately 400–450, preferably about 400. Lastly, the rear section of the floor is formed of a carbon steel base plate upon which may be overlaid a layer of chromium carbide. The rear section has a thickness of approximately ⅜–⅞ inch, preferably about ¾ inch, and a BHN of greater than about 400. However, the sections of the floor can be modified in shape, size, and material to support a variety of specialized mining operations, as would be apparent to one skilled in the art. In the preferred embodiment, the sections of the floor are formed from separate pieces, but can also be formed from one continuous piece.

In an alternate embodiment of the present invention, the front section is formed of steel plate having a thickness of about 10 mm and a BHN of approximately 360–440, preferably about 440. The middle section is formed of steel plate having a thickness of about 12 mm and BHN of approximately 400–450, preferably about 450. The rear section is formed of a carbon steel base plate which may be overlaid with chromium carbide and has a thickness of approximately 12 mm and a BHN of greater than about 450.

In yet another embodiment of the present invention, all of the sections of the floor are formed of steel plate with a BHN of approximately 360–440. The front section has a thickness of approximately ¼–½ inch. The middle section has a thickness of approximately ⅜–¾ inch. Lastly, the rear section has a thickness of approximately ⅜–⅞ inch.

The steel plate of the floor and side walls has a minimum tensile strength of approximately 900–1,100 MPa, and a yield strength of approximately 1,100 MPa. The middle section of the floor has a tensile strength of approximately 1,250–1,550 N/mm$^2$, and a yield strength of approximately 1,000–1,300 N/mm$^2$. One such material composition is manufactured by Leong Jin Corporation and is known by the name HARDOX 400/500. The rear section of the floor is preferably formed of a conventional carbon steel upon which a layer of chromium carbide is bulk welded. The overlay has a BHN of about 543. One such overlay material is manufactured by Triten Corporation and is known by the name T-200X. Other comparable or substitute materials may be used to form the floor and side walls within the aforementioned ranges of thickness and hardness.

In conventional mining operations, when payloads are dumped through a truck spillway, gradual wear on the body ensues due to friction. Using a conventional dump truck body, wear is nonuniform, and the rearward open dumping end of the body wears out faster than the forward closed end. As such, the body of the dump truck must be replaced or scrapped before its full operational use has been realized. With the body structure of the present invention, thicker and harder materials are used in the rearward end of the body, because they are subjected to more frictional wear during normal operating cycles. Thinner materials with less hardness are utilized in the forward end of the body, because they are subjected to less frictional wear during operating cycles. As a result, a lighter body with a strength capable of withstanding typical-sized payloads is realized for use. Consequently, by using this structure, the number of supporting ribs 44 are reduced, resulting in further weight savings.

For example, a typical conventional body for a 240 ton truck used in heavy duty mining operations weighs about 103,000 pounds and has a structural efficiency of about 0.219. The body of the present invention weighs about 51,000 pounds, resulting in a weight savings of about 52,000 pounds and a structural efficiency of about 0.098. Thus, when the body of the present invention is employed on a conventional heavy duty chassis 12, 52,000 more pounds of payload can be carried from the mining location on each trip, while the structural strength and shape of the body itself remains substantially unaffected. Additionally, the weight savings when the truck is empty makes the truck more fuel efficient when the truck is returning to the mining location.

In addition, as a result of typical payload transporting and dumping operations, a conventional dump truck body formed with materials of substantially uniform thickness and hardness would wear out at its rearward end first. The front end of the conventional body, however, would still have a portion of useful life remaining. By employing the body of the present invention, the operational lifetime of the body is maximized throughout its entire extent. The truck body according to the present invention has a useful operating life of about 21,000 hours.

The present invention has been shown and described with reference to presently preferred embodiments. Those skilled in the art will recognize that certain features of the invention may be used independently or in combination with other features. The materials described in the foregoing specification are examples of presently preferred materials and are not intended to limit the scope of the invention.

What is claimed is:

1. A body for a dump truck comprising:
    a floor with a pair of opposed spaced upwardly extending side walls coupled to the floor and an upwardly extending front wall coupled thereto between the side walls to create a space for carrying a payload and a rearward spillway for dumping the payload, and with the floor further formed of a plurality of adjacently positioned sections wherein the sections are arranged in an order of increasing thickness with the thickest section located at the spillway.

2. The body as set forth in claim 1 wherein each of said sections of said floor extends transversely between said side walls and has a substantially uniform characteristic thickness.

3. The body as set forth in claim 2 wherein said floor includes:
    a first floor section disposed adjacent said front wall, said first floor section having a first thickness; and,
    a second floor section disposed adjacent said spillway, said second floor section having a thickness greater than the thickness of said first floor section.

4. The body as set forth in claim 3 wherein said floor includes:
    a third floor section disposed between said first floor section and said second floor section, said third floor section having a thickness intermediate the thicknesses of said first and second floor sections.

5. The body as set forth in claim 1 wherein each side wall is formed of a plurality of adjacently positioned portions each having a substantially uniform characteristic thickness wherein the portions are arranged in an order of increasing thickness with the thickest portion located at the spillway.

6. The body as set forth in claim 1 wherein each side wall is formed of a plurality of adjacently positioned portions each having a substantially uniform characteristic hardness wherein the portions are arranged in an order of increasing hardness with the hardest section located at the spillway.

7. The body as set forth in claim 1 wherein at least one section of the floor is a single continuous piece.

8. The body as set forth in claim 1 wherein at least one section of the floor comprises more than one separate piece.

9. The body as set forth in claim 5 wherein at least one portion of each side wall comprises more than one separate piece.

10. The body as set forth in claim 5 wherein at least one portion of each side wall is a single continuous piece.

11. The body as set forth in claim 6 wherein at least one portion of each side wall comprises more than one separate piece.

12. The body as set forth in claim 6 wherein at least one portion of each side wall is a single continuous piece.

13. The body as set forth in claim 1 wherein one of the sections has a thickness of between about ¼ inch and ½ inch.

14. The body as set forth in claim 1 wherein one of the sections has a thickness of between about ⅜ inch and ¾ inch.

15. The body as set forth in claim 1 wherein one of the sections has a thickness of between about ⅜ inch and ⅞ inch.

16. A body for a dump truck comprising a floor with a pair of opposed spaced upwardly extending side walls coupled to the floor and an upwardly extending front wall coupled thereto between the side walls to create a space for carrying a payload and a rearward spillway for dumping the payload, and with the floor further formed of a plurality of adjacently positioned sections each having a substantially uniform characteristic hardness wherein the sections are arranged in an order of increasing hardness with the hardest section located at the spillway.

17. The body as set forth in claim 16 wherein at least one section of the floor is a single continuous piece.

18. The body as set forth in claim 16 wherein at least one section of the floor comprises more than one separate piece.

19. The body as set forth in claim 16 wherein one of the sections has a BHN of between about 360 and 440.

20. The body as set forth in claim 16 wherein one of the sections has a BHN of between about 400 and 450.

21. The truck body as set forth in claim 16 wherein one of the sections has a BHN of greater than about 450.

22. A dump truck comprising:
    a chassis;
    a cab mounted to the chassis; and
    a body movably coupled to the chassis and having an retracted position for allowing a payload to be carried and an extended position for allowing the payload to be dumped, and with the body further comprising a substantially planar floor with a pair of oppositely opposed and spaced side walls coupled to the floor and extended upwards therefrom and a front wall coupled thereto and extended upwards therefrom and between the side walls to create a space for carrying the payload and a rearward spillway for dumping the payload,
    wherein each side wall further includes a front portion and an adjacently positioned rear portion each formed of steel plate and each having a Brinell Hardness Number (BHN) of between about 360 and 440 and with the front portion having a thickness of between about ¼ inch and ⅜ inch and the rear portion having a thickness of between about 5/16 inch to about 7/16 inch, and
    wherein the floor further includes a front section, a rear section, and a middle section therebetween and with the sections of the floor being separate pieces that are adjacently positioned, substantially rectangular in shape, and substantially equal in width, and with the front section formed of steel plate having a thickness of between about ¼ inch and ½ inch and a BHN of between about 360 and 440, the middle section formed of steel plate having a thickness of between about ⅜ inch and ¾ inch and a BHN of between about 400 and 450, and the rear section formed of a carbon steel base plate overlaid with chromium carbide and having a thickness of between about ⅜ inch and ⅞ inch and a BHN of greater than about 450.

23. The truck as claimed in claim 22 wherein each of said floor sections extends transversely and is connected at one end to one of said side walls and is connected at the opposite end to the other of said side walls.

* * * * *

Disclaimer

6,022,068-John A. D'Amico, Casper, WYO (US). LIGHTWEIGHT BODY FOR A DUMPTRUCK. Patent dated Feb. 8, 2000. Disclaimer filed Jun. 6, 2007, by the assignee, Caterpillar Inc.

Hereby enters this disclaimer to the remaining term of the patent.

*(Official Gazette February 19, 2008)*